United States Patent [19]
Barnard, Jr.

[11] Patent Number: 4,574,836
[45] Date of Patent: Mar. 11, 1986

[54] BYPASS VALVE WITH INDICATOR

[75] Inventor: George B. Barnard, Jr., Newbury Park, Calif.

[73] Assignee: Purolator Technologies Inc., Newbury Park, Calif.

[21] Appl. No.: 671,543

[22] Filed: Nov. 15, 1984

[51] Int. Cl.$^4$ ............................................. F16K 37/00
[52] U.S. Cl. .................................. 137/553; 137/549; 137/542; 137/469
[58] Field of Search ............... 137/469, 553, 541, 542, 137/557, 549

[56] References Cited

U.S. PATENT DOCUMENTS

| | | | |
|---|---|---|---|
| 2,845,945 | 8/1958 | Mancusi | 137/469 |
| 2,875,978 | 3/1959 | Kmiecik | 137/469 X |
| 2,880,750 | 4/1959 | Amison | 137/469 |
| 3,018,792 | 1/1962 | Brucker | 137/469 |
| 3,048,188 | 8/1962 | Hunter | 137/469 |
| 3,164,164 | 1/1965 | Pall | 137/553 X |
| 3,195,556 | 7/1965 | Norstrud | 137/469 X |
| 3,288,167 | 11/1966 | Gibson | 137/541 |
| 3,651,827 | 3/1972 | Hammer | 137/469 |
| 4,084,609 | 4/1978 | Johnson | 137/542 X |
| 4,152,893 | 5/1979 | Wakita | 137/469 X |

Primary Examiner—Harold W. Weakley
Attorney, Agent, or Firm—Nilsson, Robbins, Dalgarn, Berliner, Carson & Wurst

[57] ABSTRACT

A differential fluid pressure indicator including a bypass valve which provides an indication that the filter is in the bypass condition. The bypass valve includes a differential area piston which includes at the outlet port thereof a restriction orifice adapted to insure a predetermined stroke of the poppet in the bypass valve, thereby to insure actuation of the indicator.

1 Claim, 4 Drawing Figures

BYPASS VALVE WITH INDICATOR

BACKGROUND OF THE INVENTION

1. Field of the Invention

This invention relates generally to valves and more particularly to a bypass valve which senses a predetermined differential pressure disposed thereacross and in response thereto opens to relieve the pressure and permit fluid flow therethrough and which also provides an indication that the relief valve has responded to the excess pressure and is in the bypass position.

2. The Prior Art

There are many bypass valves existing in the prior art which in response to a predetermined pressure differential thereacross will open to relieve that pressure and permit fluid flow. These bypass valves take many forms including that of the typical poppet valves. One typical application for such bypass valves is in conjunction with a fluid filter. As the filter element becomes dirty through entrapment of foreign particles suspended within the fluid that is being filtered the pressure between the inlet and the outlet of the filter increases. The increased pressure differential is indicative that the filter element needs replacing or cleaning. If the element is not replaced or cleaned, the increased pressure may ultimately destroy the filter element, or, in the case a bypass valve is installed, will allow unfiltered fluid to enter the operating apparatus with the possibility of ultimate destruction thereof.

Insofar as is known to applicant, prior art bypass valves are of the type which respond to the differential pressure and then crack or open a desired amount to permit fluid flow therethrough. Although such operation is appropriate, under some circumstances, it is also desired that an immediate release of the differential pressure be obtained. Under such conditions a differential area bypass valve has been used to insure an immediate pressure relief.

Furthermore, in the prior art there are many devices which provide an indication to the operator (visual and/or electrical) of overpressure. Applicant, however, is unaware of any prior art devices which, in the same structure, include immediate pressure relief, overpressure and bypass state indication, along with appropriate structure to ensure actuation of the bypass indication mechanism.

SUMMARY OF THE INVENTION

A bypass valve constructed in accordance with the present invention includes a poppet and seat disposed within a chamber having inlet and outlet ports through which fluid can flow. With the poppet and seat in their normal position the fluid flow path between the inlet and outlet ports is normally sealed. A first area which is defined by the poppet and the seat is exposed to a fluid pressure differential and is operative to break the seal and allow fluid flow between the inlet and outlet ports if the pressure differential exceeds a predetermined level. A second area is defined by the poppet and the body defining the chamber with the second area being larger than the first area and which is operative to rapidly move the poppet to a full open position to allow fluid to flow and quickly relieve the pressure differential. The second area and the body define a restricted orifice at the outlet port which ensures valve movement sufficient to actuate an indicator.

In accordance with a further aspect of the present invention the bypass valve structure also includes as an integral feature thereof an indicator providing to the operator a signal indicative of the occurrence of an overpressure and bypass condition.

DETAILED DESCRIPTION OF THE PREFERRED EMBODIMENT

Figure 1:
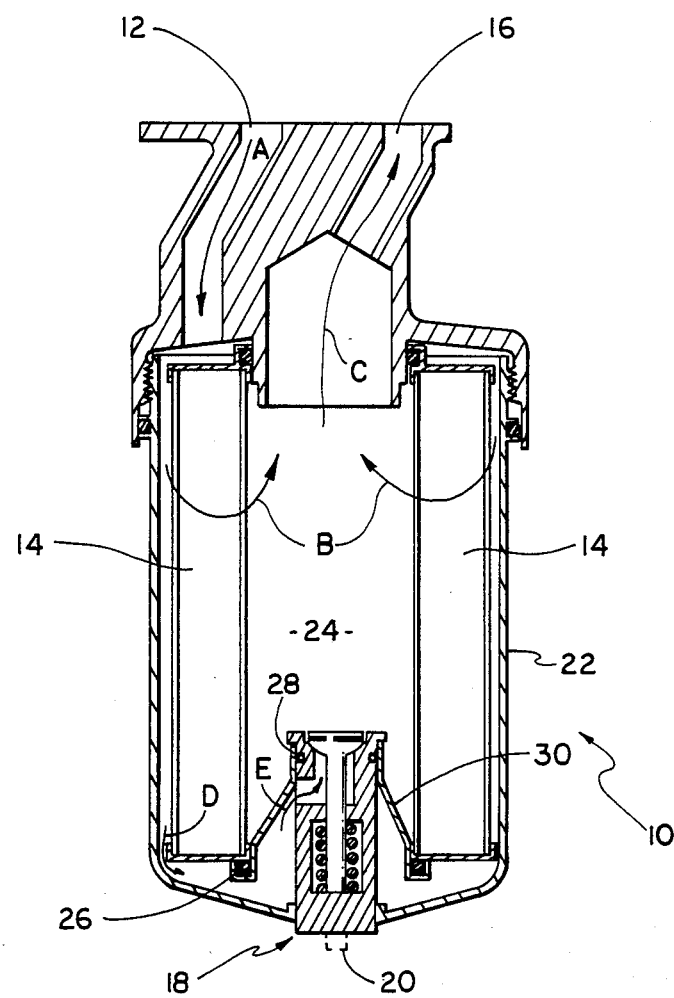
FIG. 1 is a schematic representation in cross section of a filter with a bypass valve constructed in accordance with the teachings of the present invention disposed therein.

As is shown in FIG. 1 generally at 10, there is illustrated a filter assembly indicative of the typical application of a bypass valve constructed in accordance with the present invention. Fluid is applied to an inlet 12 and after being appropriately filtered by a filter element 14 exits through an outlet 16 for application to a desired using apparatus. Fluid flow is from outside in through the filter as will be recognized by those skilled in the art. A bypass valve 18 is disposed in such a manner that it has the fluid pressure between the inlet and outlet 12 and 16, respectively, applied thereacross. When the filter element 14 becomes substantially clogged through entrapment of foreign particles the pressure across the inlet and outlets 12 and 16 of the filter increases. When the increase in pressure differential reaches a predetermined point the bypass valve 18 becomes operative and typically provides a visual indication such as a button or the like such as shown in dashed lines at 20. The indication signal may also be electrical, audible or a combination thereof as desired. This indication signals the operator that the filter element 14 needs cleaning or replacing.

As is illustrated the bypass valve and the indicator are formed as a part of the same structure. In the prior art these functions (bypass and indication) have been usually performed by separate devices. Utilization of separate devices inherently create several disadvantages which are overcome by the present invention. Less space and weight are utilized and, more importantly, in the device of the present invention, when the indicator shows, the bypass valve is in its bypass condition. In prior art devices using separate components, actuation of a separate indicator because of overpressure may not guarantee opening of the bypass valve and vice versa.

As is illustrated in FIG. 1, the fluid to be filtered flows through the inlet as indicated by the arrow A through the outer area surrounding the filter element 14 and within the case 22. The fluid flows through the filter element as indicated by the arrows B and then outwardly through the outlet 16 as indicated by the arrow C. The fluid which is within the area between the filter and the casing also finds its way, as indicated by the arrows D and E into the interior portion of the bypass valve 18. As a result, the pressure of the fluid to be filtered which flows into the inlet 12 also is presented within the bypass valve 18. The filtered fluid which appears within the chamber 24 after being filtered is then on the outside of the bypass valve 18. As is illustrated, the bypass valve is inserted within the bottom of the casing 22 and has appropriate seals 26 and 28 along with the ring 30 to seal the contents of the chamber 24 from the fluid to be filtered on the outside of the filter element 14. This construction as will be obvious to those skilled in the art places the pressure differential between the fluid to be filtered and the filtered fluid directly across the bypass valve 18.

Figure 2:
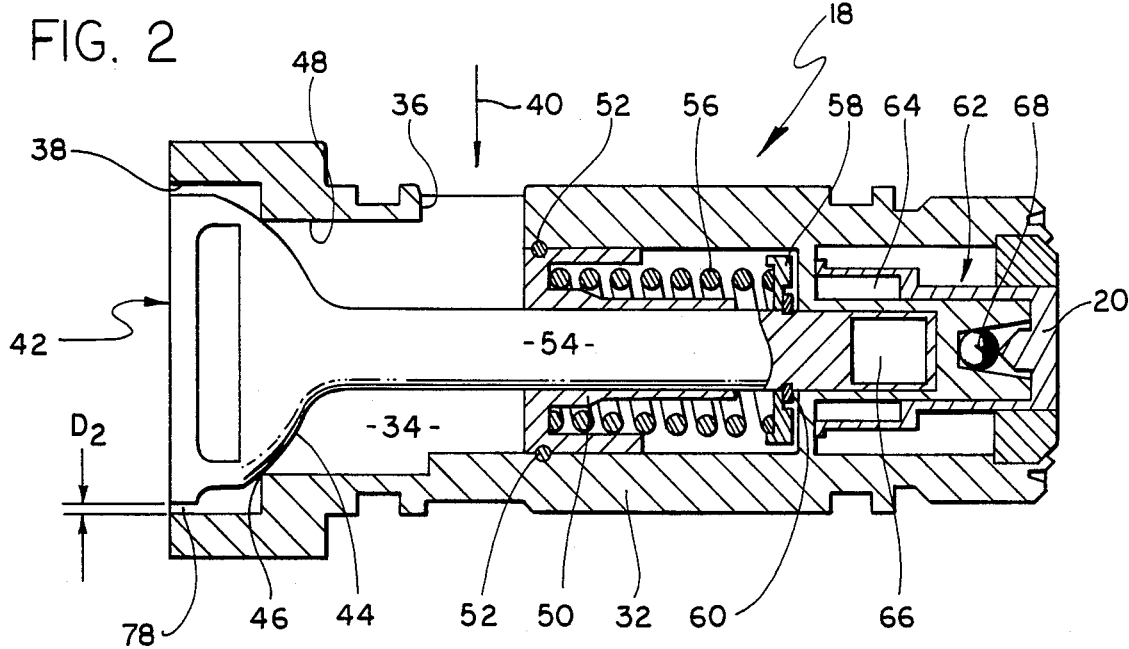
FIG. 2 is a cross sectional view of a bypass valve constructed in accordance with the present invention.

The bypass valve constructed in accordance with the principles of the present invention is illustrated in greater detail in FIG. 2 to which reference is hereby made. As is shown in FIG. 2, the bypass valve includes a body 32 defining a chamber 34 therein. The chamber includes an inlet port 36 and an outlet port 38. Fluid to be filtered enters the inlet port 36 as shown by the arrow 40 and as above described in conjunction with the apparatus illustrated in FIG. 1 which includes the bypass valve as shown in FIG. 2. A poppet 42 is disposed within the chamber 34 and includes a surface 44 which engages a seat 46 defined by the interior surface 48 of the body 32. A guide 50 is disposed within the body and is held in place by pins 52. The guide 50 receives the stem 54 which forms a part of the poppet 42. Disposed within the guide 50 is a spring 56 which is seated against a retainer 58 held in place upon the stem 54 by a retainer ring 60. The spring 56 is also seated against the guide 50 as illustrated and biases the poppet 42 toward a seated position against the seat 46 as is illustrated in FIG. 2.

An indicator mechanism 62 including a ring magnet 64 surrounding a bar magnet 66 carried by the stem 54 of the poppet 42 functions to provide the overpressure and bypass indication to the operator of the filter. When in the position shown in FIG. 2, the magnetic forces interact to retain the button 20 in the position illustrated. If, however, the magnet 66 moves against the force of the spring 56 as a result of differential pressure being applied, the magnetic forces cause the ring magnet to be repelled and the button then moves toward the position shown in dashed lines in FIG. 1. When such occurs the ball 68 falls into the space between the bottom portion of the case and the indicator 20 precluding the indicator 20 returning to the position shown in FIG. 2 until the casing has been removed to replace the filter, turned upside down to allow the ball to return to the position shown in FIG. 2, and then the indicator returned manually to the position shown in FIG. 2. Although a specific type of visual indicator has been illustrated and described herein, such is not to be taken as a limitation on the scope of the present invention since any indicator known may be incorporated as a part of the bypass valve.

Figure 3:
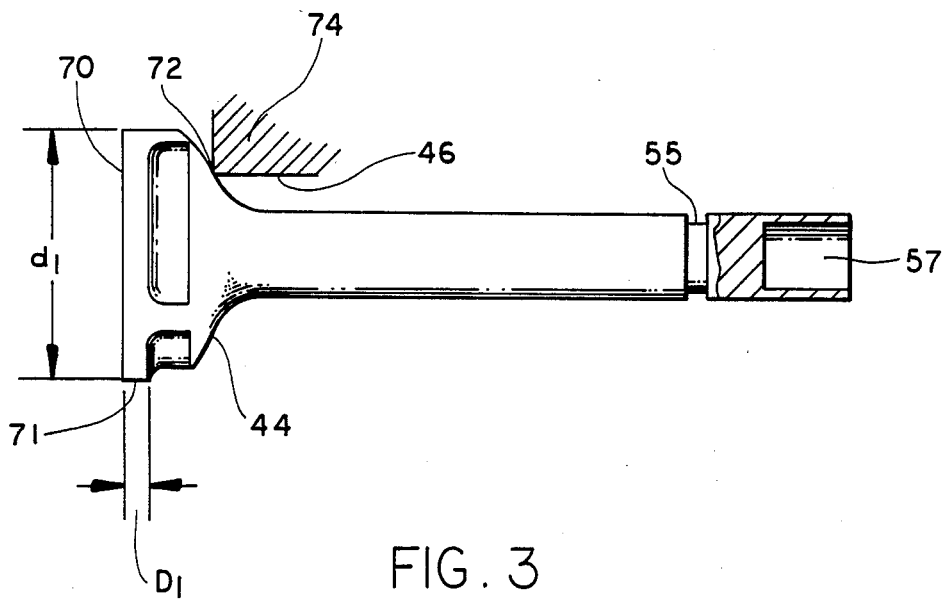
FIG. 3 is an elevational view of the poppet constructed in accordance with the principles of the present invention.
Figure 4:
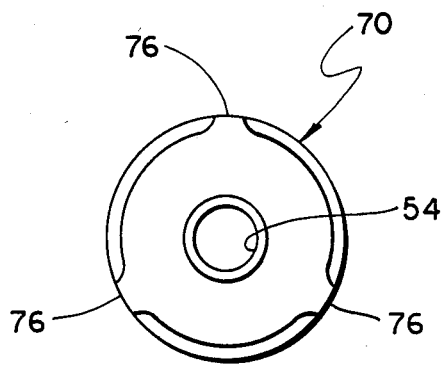
FIG. 4 is a bottom view of the poppet shown in FIG. 3.

As is shown in FIG. 3, the poppet includes a head 70 having a first diameter d1. The head 70 includes a skirt which extends for a predetermined distance D1. The diameter d1 thereafter decreases continuing past the line contact shown at point 72 where the seat 46 engages the surface 44 of the poppet as is illustrated in FIG. 3 by the cross-hatched area 74. It will be noted that the surface 44 continues to decrease in diameter continuously passed the point 72 until the stem 54 is reached. The stem 54 defines a groove 55 for receiving the retainer ring 60 and a recess 57 for receiving the bar magnet 66. The head 70 of the poppet defines a plurality of ribs 76 which are a continuation of the surface 44 up to the skirt 71. The ribs 76 function as guide members as will be more fully described below.

By reference now again to FIG. 2, it will be noted that the differences in diameter d1 of the head of the poppet 42 and the diameter of the outlet port 38 of the chamber 34 define an annular restriction orifice 78 having a predetermined dimension D2. The restriction orifice 78 has a length equal to the skirt 71 length D1, shown in FIG. 3 and the opposed wall of the housing defining the outlet port 38.

The operation of the bypass valve constructed in accordance with the present invention will now be described. As the pressure across the valve increases so that the differential pressure exceeds the predetermined amount as established by the force of the spring 56, that pressure acting upon a first area defined by the surface 44 and the seat 46 between the point 72 and the stem 54 will apply sufficient force to the poppet to cause it to move away from the seat 46, breaking the seal preventing the flow of fluid between the inlet 36 and the outlet port 38. As the seal is broken it will be noted that since the surface 44 continues to decrease toward the stem 54, the distance between the surface 44 and the seat 46 rapidly increases. As a result, the pressure appearing in the chamber 34 less any loss through the restriction orifice which prevents the pressure from dissipating is immediately applied across the head of the poppet 42 over the area defined by the diameter d1, less the diameter of the stem 54. It will be noted that as a result of the increased diameter of the poppet head exposed to the pressure within the chamber 34, an increased force is applied to the poppet causing it to rapidly move away from the seat 46. This applied pressure and rapid movement will continue until the poppet has moved a predetermined distance equal to the length of the skirt 71. When skirt 71 clears the outlet port opening 38 the bypass operation may commence. At such point the pressure differential is immediately relieved and the poppet through the urging of the spring 56 will return to the seated position as shown in FIG. 2 and will remain in that position until the differential pressure again reaches a level greater than the predetermined amount as above described. Through appropriate selection of the restriction orifice size, reseating of the poppet at the desired pressure may be obtained.

It will be noted that the poppet will travel, at least through the distance D1, determined by the length dimension of the skirt 71. This occurs since the size of the orifice 78 remains constant during the travel of the poppet until it has traveled at least through the stroke D1. The stroke distance may be varied and may be any amount desired for a particular application. In accordance with the principles of the present invention that stroke is determined by the amount sufficient to move the magnet 66 through a distance sufficient to activate the visual indicator 20. It will be recognized that the visual indicator 20 is only activated when the poppet has stroked through a distance sufficient also to place the valve in its bypass condition.

The particular size of the orifice 78 is determined by the viscosity of the fluid being filtered and it will be recognized that the greater the viscosity the larger D2 in order to provide the desired opening and then subsequent closing of the bypass valve.

What is claimed is:

1. In a bypass valve useful in a filter assembly and operable responsive to a predetermined fluid pressure differential having:

a body defining a chamber having an inlet and an outlet port, means for applying fluid under pressure to said inlet and outlet ports, valve means disposed within said outlet port and including a poppet and seat normally sealed and blocking fluid flow through said chamber when said pressure differential is below said predetermined differential, and a bypass indicator carrying a first permanent magnet thereon and retained in a non-bypass indicating position by attraction of a second permanent magnet carried by said valve means when said poppet and seat are normally sealed, the improvement comprising:

first and second surfaces defined by said poppet and first and second surfaces defined by said body, said first surfaces when in mutual engagement seal to block fluid flow;

a first area, defined by said poppet and said seat, exposed to the fluid pressure differential and operative to initially move said poppet away from said seat to break said seal and allow fluid flow between said inlet and outlet ports when said predetermined differential pressure is reached;

a second area, defined by said poppet and said body, exposed to the fluid pressure differential after said seal is broken, said second area being larger than said first area, and operative to rapidly move said poppet to an open position to allow said fluid to flow and quickly relieve said pressure differential;

said second surfaces being disposed in opposed relationship and defining a restricted orifice therebetween, said second surface on said poppet having a predetermined length such that said restricted orifice is maintained for a predetermined stroke of said poppet in said body prior to its travel to said open position;

said bypass indicator moving from its non-bypass indicating position to a bypass indicating position only when said poppet has moved through its predetermined stroke where said first and second permanent magnets magnetically repell each other, and mechanical lock means for preventing said bypass indicator from returning to the non-bypass indicating position in the absence of said pressure differential without first being removed from said filter assembly.

* * * * *